(12) United States Patent
Ostiguy et al.

(10) Patent No.: US 8,736,626 B2
(45) Date of Patent: May 27, 2014

(54) METHOD AND SYSTEM FOR CRYPTOGRAPHICALLY SECURING A GRAPHICS SYSTEM

(75) Inventors: Jean-Jacques Ostiguy, Montréal (CA); Andre Testa, Laval (CA)

(73) Assignee: Matrox Graphics Inc., Dorval (CA)

( * ) Notice: Subject to any disclaimer, the term of this patent is extended or adjusted under 35 U.S.C. 154(b) by 629 days.

(21) Appl. No.: 12/198,831

(22) Filed: Aug. 26, 2008

(65) Prior Publication Data

US 2010/0053180 A1    Mar. 4, 2010

(51) Int. Cl.
| | | |
|---|---|---|
| G09G 5/39 | (2006.01) | |
| G06F 13/28 | (2006.01) | |
| G06F 13/00 | (2006.01) | |
| G06F 11/30 | (2006.01) | |
| G06F 12/14 | (2006.01) | |

(52) U.S. Cl.
USPC ........... 345/531; 345/532; 345/533; 345/537; 345/538; 713/189

(58) Field of Classification Search
USPC ........... 345/531, 533, 532, 538; 713/189–194
See application file for complete search history.

(56) References Cited

U.S. PATENT DOCUMENTS

| | | | |
|---|---|---|---|
| 5,319,388 A * | 6/1994 | Mattison et al. | 345/558 |
| 5,825,879 A | 10/1998 | Davis | |
| 5,977,997 A * | 11/1999 | Vainsencher | 345/519 |
| 7,065,651 B2 * | 6/2006 | Evans | 713/189 |
| 7,113,546 B1 * | 9/2006 | Kovacevic et al. | 375/240.26 |
| 7,197,648 B2 | 3/2007 | Evans | |
| 7,203,310 B2 * | 4/2007 | England et al. | 380/200 |
| 7,272,726 B2 | 9/2007 | Evans | |
| 7,299,365 B2 | 11/2007 | Evans | |
| 7,302,586 B2 | 11/2007 | Evans | |
| 7,337,328 B2 | 2/2008 | Evans | |
| 7,337,329 B2 | 2/2008 | Evans | |
| 7,966,465 B2 * | 6/2011 | Rodgers | 711/163 |
| 2002/0163522 A1 * | 11/2002 | Porter et al. | 345/533 |
| 2006/0064535 A1 * | 3/2006 | Walker | 711/5 |
| 2006/0288235 A1 * | 12/2006 | Goto | 713/190 |
| 2007/0154018 A1 * | 7/2007 | Watanabe | 380/273 |

* cited by examiner

*Primary Examiner* — Ke Xiao
*Assistant Examiner* — Jed-Justin Imperial
(74) *Attorney, Agent, or Firm* — Rhodes Donahoe, LLC (57) ABSTRACT

A system and method for cryptographically securing a graphics system connectable via an external bus to a computing system, the graphics system including a graphics processor, a video memory and a memory controller for controlling the flow of data to and from the video memory. The graphics system further includes a copy engine for copying data between a system memory of the computing system and the video memory, where this copy engine acts independently of the graphics processor of the graphics system. The present invention enables the copy engine of the graphics system to decrypt encrypted data in the course of copying data from the system memory to the video memory and to encrypt unencrypted data in the course of copying data from the video memory to the system memory. Thus, cryptographic protection of secure content may be assured by the graphics system without the excessive usage of its primary resources for this non-graphical purpose.

15 Claims, 5 Drawing Sheets

METHOD AND SYSTEM FOR CRYPTOGRAPHICALLY SECURING A GRAPHICS SYSTEM

TECHNICAL FIELD

The present invention relates generally to the field of graphics systems. More specifically, the invention relates to a method and system for cryptographically securing a graphics system.

BACKGROUND

These days, the level of security built into a graphics system is an important feature, since many new applications of graphics systems require that the graphics system be able to protect confidential data. Examples of such new applications include medical imaging (confidential information is displayed on the screen regarding a patient's health), video editing, video playback, digital signage and even general processing (the graphics processor unit (GPU) is a highly parallel processor and may be used to efficiently execute some general mathematical code).

In these new applications, the access to the data processed by the graphics processor and stored in the video memory (or the data used during the processing and stored in the video memory) may need to be protected. In order to address this problem, various techniques have been devised to protect data during its transfer to or from the graphics system of a computing platform, as well as within the graphics system itself. Unfortunately, these protection techniques are often very complex and may be associated with high computation requirements and/or the excessive use of resources of the graphics system, which can ultimately degrade the performance of the graphics system, as will be discussed below.

Figure 1:
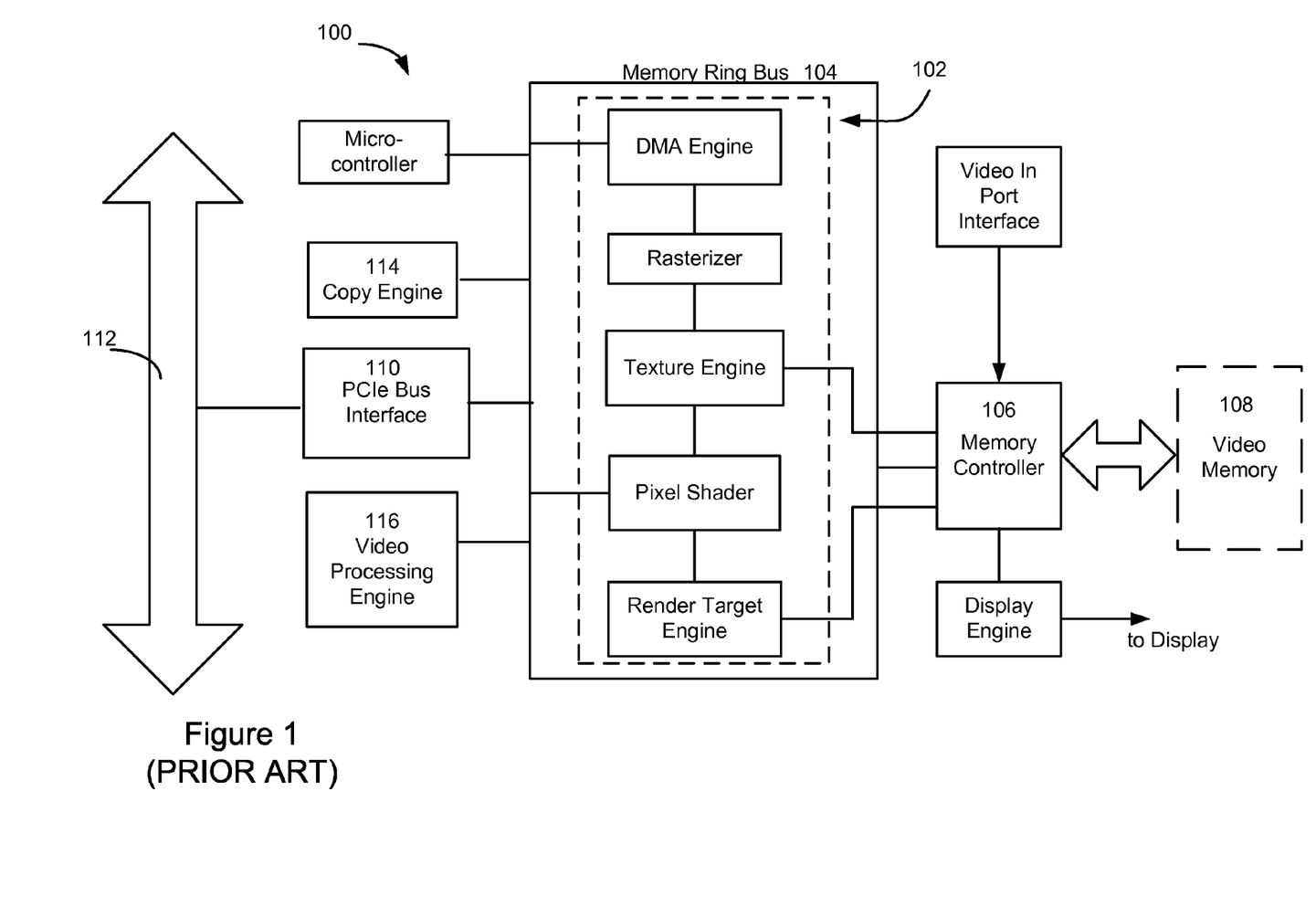
FIG. 1 is a schematic block diagram of an exemplary prior art graphics system.

FIG. 1 shows an exemplary prior art graphics system 100 that includes a graphics processor 102 (also referred to as a graphics pipeline), a memory ring bus 104, a memory controller 106, a video memory 108 and a video processing engine 116, among many other components. A bus interface 110 supports an external bus 112 that is used by a host computer (not shown) to connect with the graphics system 100. The data processed by the graphics processor 102 is stored in the video memory 108. In operation, data exchanges often occur between the host computer's system memory and the video memory 108, where the data is sent over the bus 112. During a data transfer over the bus 112, it is possible for devices connected to the bus 112 to "listen" to and copy the data as it is being transferred.

The configuration of the graphics system 100 shown in FIG. 1 is one in which a memory ring bus 104 interconnects, and thus is shared by, the various components of the graphics system 100, including the bus interface 110 and the memory controller 106. Another common configuration of the graphics system 100 is one in which the various components of the graphics system 100 are directly connected to both the bus interface 110 and the memory controller 106, thus precluding the need for a memory ring bus 104.

An optional component of the prior art graphics system 100 is the copy engine 114, which is responsible for copying data between the system memory of the host computer and the video memory 108. More specifically, the copy engine 114 executes copy instructions, each copy instruction being to copy a range of data from system memory to video memory 108 or from video memory 108 to system memory. In doing so, the copy engine 114 requests reading a range of data from either system memory or video memory 108 and then requests writing this range of data to either video memory 108 or system memory. Since the copy engine 114 is dedicated to this copying functionality, the speed and efficiency of the graphics system 100 are increased without placing any undue extra burden on the other components of the graphics system 100.

In a graphics system 100 that does not include a copy engine, the graphics processor 102 may be responsible for copying data from the system memory of the host computing system to the video memory 108. For example, the graphics processor 102 may: a) execute a BLIT operation resulting in the transfer of a surface from system memory to video memory 108; b) execute a copy instruction resulting in reading a surface in system memory and writing it into video memory 108; c) execute an instruction for rendering a rectangle with a texture stored in system memory and storing the processed rectangle in video memory 108. Note that these are but a few examples; other techniques to copy data from system memory to video memory 108 may also be used by the graphics processor 102. Regardless of the particular technique used, what is important to realize is that, in each case, the graphics processor 102 is busy transferring data from system memory to video memory 108, rather than performing its principal task of processing an image or a primitive. On the contrary, when the graphics system 100 includes a copy engine 114, the graphics processor 102 and the copy engine 114 may operate in parallel, the graphics processor 102 processing data while the copy engine 114 is copying data to video memory 108.

Figure 4:
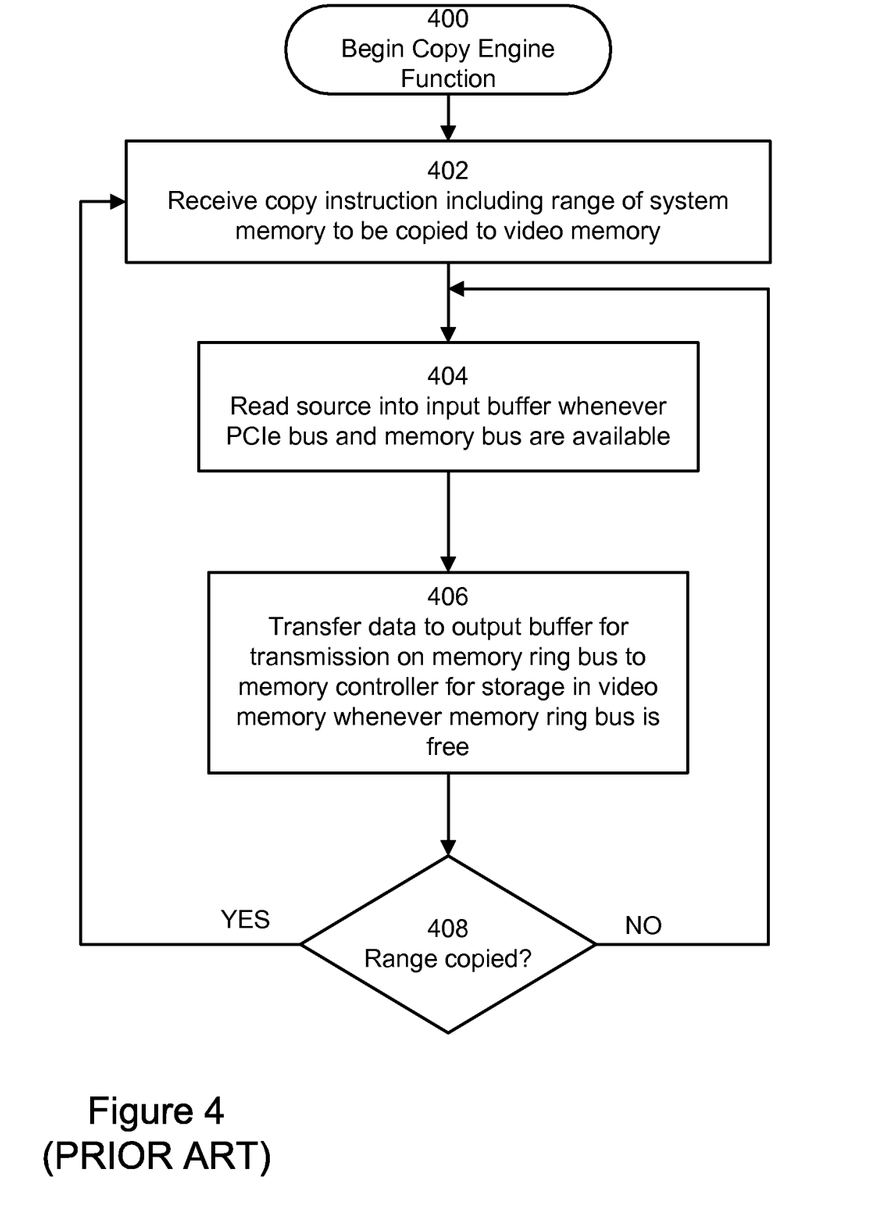
FIG. 4 is a flow diagram illustrating the memory copy process implemented by the prior art copy engine of FIG. 1.

For the purpose of clarifying the standard functionality of a copy engine within a graphics system, FIG. 4 is a flowchart illustrating an example of the prior art memory copy process implemented by copy engine 114. Note that, in this example, the copy engine 114 is copying data from the system memory to the video memory 108; however, a similar process is implemented by the copy engine 114 when copying data from video memory 108 to system memory. At step 402, the copy engine 114 receives a copy instruction including a range of system memory to be copied to video memory 108. Next, the copy engine 114 reads data from the specified range into an input buffer, whenever the external bus 112 and the memory ring bus 104 are free and available for use by the copy engine 114, at step 404. At step 406, the copy engine 114 transfers the read data from the input buffer to an output buffer, for transmission on the memory ring bus 104 to the memory controller 106 for storage in the video memory 108, whenever the memory ring bus 104 is free. At step 408, the copy engine 114 checks whether the entire range of system memory specified in the copy instruction has been copied. If so, the copy engine 114 awaits receipt of another copy instruction. If not, the copy engine 114 continues reading data from the specified range of system memory at step 404.

Prior art solutions for preventing pirate attacks on secure data are typically based on some form of cryptographic protection of the data and/or of the graphics system itself. In one such solution, data is stored in the video memory in an encrypted form so that it is unreadable to rogue devices and applications. While this prevents the data from being read, it also requires that the data be continually maintained in an encrypted form. If the graphics system wishes to process the data, it must decrypt on read, process and re-encrypt on every write back to the video memory. This leads to the impractical and undesirable scenario where several decryptor/encryptor pairs within the graphics system have to operate simultaneously at very high data rates.

Another prior art solution is described by Glenn F. Evans in U.S. Pat. No. 7,065,651, issued Jun. 20, 2006. Evans discloses that data intended for use by a video card is selectively encrypted such that anytime the data is provided onto a bus between the video card and the computer system, the data is encrypted. Video memory is divided into protected and unprotected portions, where a respective pair of encryption/ decryption keys is associated with each protected memory portion. When encrypted data is received onto the video card, the data is automatically decrypted with a decryption key associated with a protected memory portion into which the decrypted data is written. The GPU of the video card can then freely operate upon the decrypted data. If the data is to be moved to an unprotected portion of video memory or to memory remote from the video card, the data is encrypted with an associated encryption key before being moved. Evans also discloses variations in terms of the level of security afforded by the solution. For example, a tamper detection mechanism may be added to the video card, so that there is awareness when data has been altered in some fashion, while contents of overlay surfaces and/or command buffers may be encrypted. Furthermore, the GPU may be enabled to operate on encrypted content, all the while preventing its availability to untrusted parties, devices or software.

In the case of the prior art solution taught by Evans, the memory controller of the video card is fundamental to the operation of the video card, since it manages the memory on the video card. However, this memory controller is also critical to the success of the cryptographic protection scheme, since it implements the primary decryption functionality of the video card, decrypting received encrypted data into protected portions of the video memory and ensuring that any data transfers on the video card take place in a manner that ensures the protection of the unencrypted data. In another embodiment described by Evans, the memory controller enforces memory protection by controlling access to the protected portions of the video memory via an access control list, while it is the GPU that implements the decryption functionality of the cryptographic protection scheme.

Unfortunately, in all the prior art implementations described above, key components of the graphics system, notably the memory controller and the GPU, are modified and/or used in order to implement the decryption functionality of the cryptographic protection scheme(s). Thus, resource usage within the graphics system must be shared between the normal, desired graphics operations of the graphics system and the functionality designed to prevent pirate attacks on the secure data being processed by the graphics system. Obviously, this leads not only to a more complicated graphics system, but also to a deterioration of the performance and speed of the graphics system.

Consequently, there exists a need in the industry to provide an improved method and system for cryptographically securing a graphics system in order to prevent pirating of secure data.

SUMMARY

In accordance with a broad aspect, the present invention provides a graphics system connectable via an external bus to a computing system, the computing system including a system memory. The graphics system includes a video memory for storing data, a memory controller coupled to the video memory and operative to control the flow of data to and from the video memory, and a graphics processor operative to process data received by the graphics system, data stored in the video memory and data stored in the system memory. The graphics system further includes a copy engine for copying data between the video memory and the system memory of the computing system, where the copy engine acts independently of the graphics processor and is responsive to a copy instruction including a range of system memory to copy data from the system memory to the video memory. The copy engine includes a decryption module and is operative to decrypt encrypted data read from the system memory over the external bus and to transfer the decrypted data to the video memory via the memory controller.

Advantageously, the cryptographic protection functionality of the graphics system is implemented by a module of the graphics system that acts independently of the primary resources of the graphics system, notably the graphics processor and the memory controller. More specifically, the inclusion in the graphics system of a copy engine dedicated to the copy functionality allows for copying operations to be performed in parallel with the main tasks being performed by the graphics processor and the memory controller. Since the cryptographic protection functionality is built into this copy engine, the decryption operations are also performed in parallel with, and thus independently from, standard operations by the graphics processor and the memory controller. Accordingly, the speed and performance of the graphics system are improved since its primary resources may be dedicated to the normal, desired graphics operations of the graphics system, rather than be used to implement the cryptographic protection functionality.

In the context of the present description, the expression "independently of" is intended to imply that the copy engine implements the standard copying functionality, as well as the cryptographic protection functionality, without burdening the primary resources (such as the graphics processor and the memory controller) of the graphics system, leaving these primary resources free to perform their own standard operations in parallel to the operations performed by the copy engine. Note however that the fact that the copy engine acts independently of the graphics processor does not exclude the scenario where the copy engine receives and executes a copy instruction forwarded from the graphics processor. Furthermore, the fact that the copy engine acts independently of the memory controller does not exclude the scenario where the copy engine must wait for access to the video memory due to unavailability of the memory controller.

In accordance with another broad aspect, the invention provides a copy engine for a graphics system connected via an external bus to a computing system, the graphics system including a graphics processor, a video memory and a memory controller operative to control the flow of data to and from the video memory, the computing system including a system memory. The copy engine is operative to copy data between the video memory of the graphics system and the system memory of the computing system, whereby the copy engine acts independently of the graphics processor and is responsive to receipt of a copy instruction including a range of system memory to copy data from the system memory to the video memory. The copy engine includes a decryption module and is operative to decrypt encrypted data read from the system memory over the external bus and to transfer the decrypted data to the video memory via the memory controller.

In accordance with yet another broad aspect, the invention provides a method for securely copying data from a system memory of a computing system to a video memory of a graphics system, the graphics system being connected via an external bus to the computing system, the graphics system including a graphics processor and a memory controller for controlling the flow of data to and from the video memory. The method includes the steps of: a) receiving a copy instruction including a range of system memory to be copied, the copy instruction including a protection status indicative of whether the data to be copied is encrypted or not; b) reading data from the specified range of system memory; c) if the data read from the specified range of system memory is encrypted, decrypting the data read from the specified range of system memory, whereby the receiving, reading and decrypting steps are performed independently of both the graphics processor and the memory controller of the graphics system; d) transferring the decrypted data to the memory controller for storage in the video memory.

In accordance with a further broad aspect, the invention provides a method for securely copying data from a video memory of a graphics system to a system memory of a computing system, the graphics system being connected via an external bus to the computing system, the graphics system including a graphics processor and a memory controller for controlling the flow of data to and from the video memory. The method includes the steps of: a) receiving a copy instruction including a range of video memory to be copied, the copy instruction including a protection status indicative of whether the data to be copied is to be encrypted or not; b) reading data from the specified range of video memory via the memory controller; c) if the data read from the specified range of video memory is to be encrypted, encrypting the data read from the specified range of video memory; d) transferring the encrypted data to the system memory via the external bus, whereby the receiving, encrypting and transferring steps are performed independently of both the graphics processor and the memory controller of the graphics system.

BRIEF DESCRIPTION OF THE DRAWINGS

The invention will be better understood by way of the following non-limiting detailed description of examples of implementation of the invention, with reference to the appended drawings, in which.

DETAILED DESCRIPTION

The present invention is directed to a secure graphics system that allows for cryptographic protection of secure content without excessive usage of its primary resources leading to performance degradation.

Figure 2:
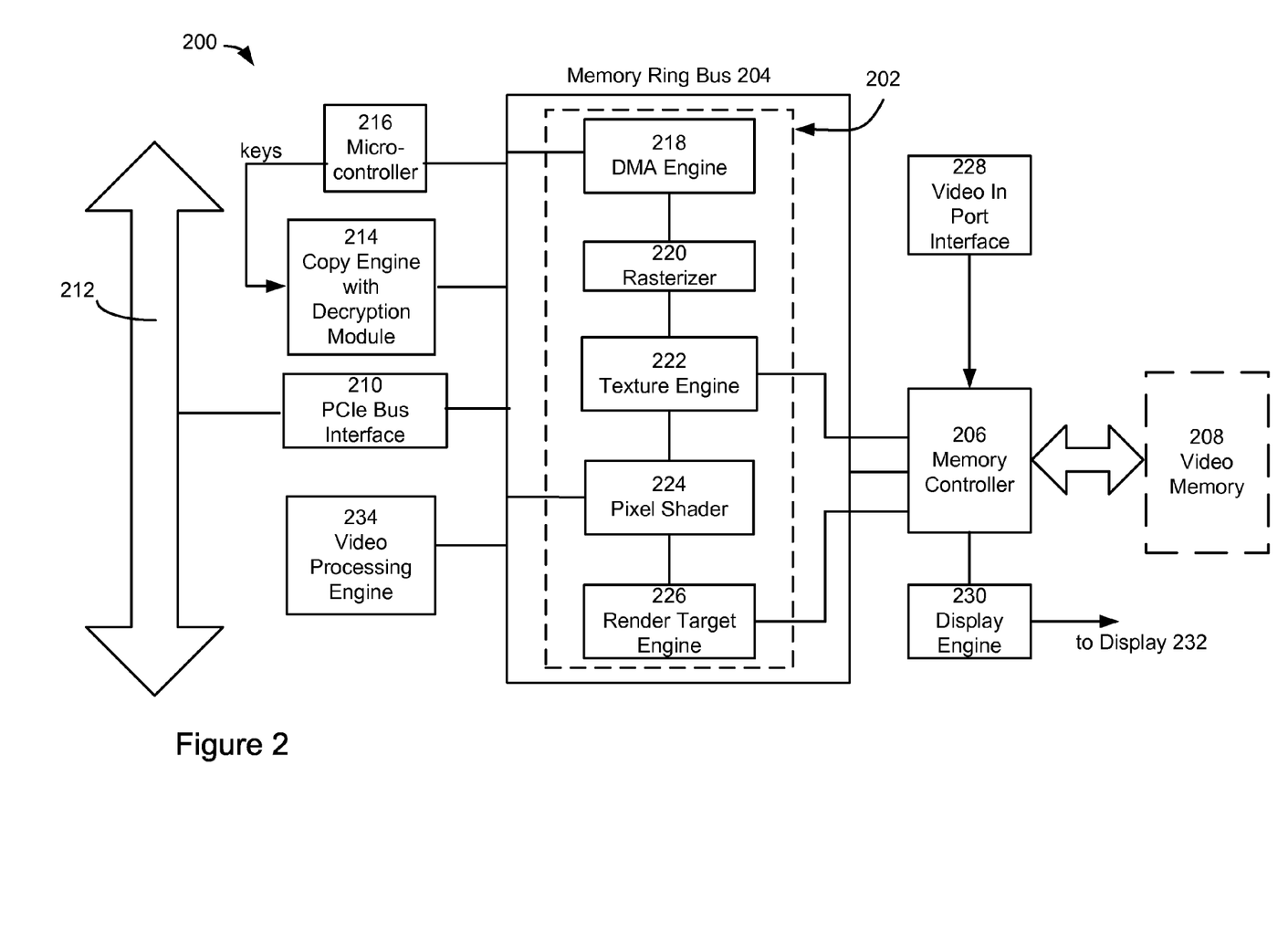
FIG. 2 is a schematic block diagram of a graphics system, in accordance with a non-limiting example of implementation of the present invention.

FIG. 2 illustrates a schematic block diagram of a graphics system, in accordance with a non-limiting example of implementation of the present invention. As shown, the graphics system 200 is made up of several different components, including a graphics processor 202, a memory controller 206 and a video memory 208.

The graphics processor 202 (or graphics pipeline) is a dedicated and specialized processor with advanced processing capabilities, which allow the graphics system 200 to process 2D graphics data, 3D graphics data, video data and more generally digital data. The graphics processor 202 includes a plurality of dedicated graphical modules (220, 222, 224, 226), which may be configured to control all aspects of resolution and color depth, as well as all elements associated with rendering images on a display 232. An example of the functionality of a standard graphics processor 102, as provided by these dedicated graphical modules, will be discussed in further detail below.

The video memory 208 is responsible for storing data that is used by and generated by the components of the graphics system 200. In particular, a portion of the video memory 208, commonly referred to as the frame buffer may store images processed by the graphics processor 202 (in the form of digital bitmaps) before they are output from the graphics system 200 for display or for further processing. The ability of the graphics system 200 to process data quickly is affected not only by the response time of the video memory 208 but also by the capacity of the video memory 208 to store data. Accordingly, different types and capacities of video memory 208 exist and may be used by the graphics system 200, such as Video RAM (VRAM), Windows RAM (WRAM), EDO DRAM, SDRAM, SGRAM and DDRAM. These memory technologies are well known to those skilled in the art and will not be discussed in further detail herein.

The memory controller 206 acts as an interface between the video memory 208 and all of the other components of the graphics system 200. More specifically, the memory controller 206 controls the flow of data to and from the video memory 208, in order to manage the contents of the video memory 208. In a non-limiting example, the memory controller 206 receives instructions to read or write data to or from video memory 208, and handles these requests according to the priority of the task and the availability of the memory interface. Note that the memory controller 206 may handle a plurality of such requests concurrently.

It follows that the memory controller 206 may be coupled to the display engine 230, which outputs the processed data to the display 232. When data stored in video memory 208 is to be displayed on the display 232, the memory controller 206 transfers this data from the video memory 208 to the display engine 230, which ensures that the data is in a form that is compatible with the display 232. In other words, the display engine 230 will perform any necessary conversions on the internal digital data of the image, such that it is understandable by the display 232. In a specific example, such a conversion is required where the display 232 uses analog signals. Furthermore, the display engine 230 may format the data stored in video memory 208 according to a refresh rate and a resolution specific to the display 232.

It is important to note that the video memory 208 may be implemented either internally or externally to the graphics system 200. In the latter case, the video memory 208 may simply be connected to the memory controller 206 by a physical interface or may actually be remote from the graphics system 200, communicatively coupled to the memory controller 206 by a bus.

In the non-limiting example shown in FIG. 2, the memory controller 206 is also coupled to a video in port interface 228, which supports connections with a television receiver, DVD players, video recorders and video game consoles, among other possibilities.

The graphics system 200 includes a bus interface 210, which supports a connection with an external bus 212 over which the graphics system 200 may exchange data with a processing unit (for example a CPU) or a system memory of a host computing system (not shown). In operation, the processing unit of the host computing system may send to the graphics system 200 via the bus 212 a set of drawing instructions and data, to be processed by the graphics processor 202 of the graphics system 200. In another example, the data contained in the video memory 208 may need to be transferred to the system memory of the host computing system, in order to free up space for storing other data in the video memory 208. Furthermore, the graphics system 200 may receive a video stream from the host computing system to be stored in the video memory 208.

In the context of the present invention, data transmitted over the external bus 212 is selectively encrypted, in order to protect secure content from being read by a hacker or a pirate during its transmission over the bus 212. Further discussion of the particular cryptographic protection scheme supported by the graphics system 200 follows below.

In the example of FIG. 2, the external bus 212 is a PCIe bus and the bus interface 210 is a PCIe bus interface. Obviously, different types of busses or bus architectures, and thus of bus interfaces, may be used to interconnect the graphics system 200 with the host computing system, without departing from the scope of the present invention. Examples of different such bus architectures include Accelerated Graphics Port (AGP) bus, Peripheral Component Interconnect (PCI) bus, Video Electronics Standards Association (VESA) local bus, PCIe over fiber optical link, among other possibilities.

It should be noted that the host computing system that exchanges data with the graphics system 200 may be any one of many well known computing systems, environments and/or configurations. Examples include a personal computer (PC), a server computer, a thin client, a thick client, a handheld or laptop device, a multiprocessor system, a microprocessor-based system, a set top box, a programmable consumer electronic device, a network PC, a minicomputer, a mainframe computer and a distributed computing environment, among other possibilities. It follows that, in certain implementations, the graphics system 200 may be local to the computing system, while in other implementations, the graphics system 200 may be remote from the computing system. In one specific example, the graphics system 200 is a graphics processor unit (GPU) of a PC, exchanging data with the CPU and system memory of the PC over the bus that couples the various system components of the PC. In another specific example, the graphics system is implemented as a remote client of a server computer, exchanging data with the CPU and system memory of the server computer over an Ethernet connection.

As seen in FIG. 2, the graphics system 200 also includes a microcontroller 216, a video processing engine 234 and a memory ring bus 204. The microcontroller 216 is a processor that may be assigned a variety of tasks. In a specific example, it may control the overall operation of the graphics system 200, including the inter-cooperation of the various components of the graphics system 200 and the communications between the graphics system 200 and its host computing system. The microcontroller 216 may be characterized by varying degrees of complexity, depending on the particular implementation of the graphics system 200.

The video processing engine 234 may be used for some or all video playback tasks, such as decompression, deinterlacing, scaling, color conversion and compositing, among other possibilities.

The memory ring bus 204 shown in the non-limiting example of FIG. 2 allows for the various components of the graphics system 200 to communicate between one another, as well as with the video memory 208 via the memory controller 206 and with the system memory of the host computing system via the PCIe bus 212. More specifically, the components of the graphics system 200 will generate and send requests to access the memory ring bus 204 and to transfer data through the memory ring bus 204 to another component. These requests are handled on the basis of the priority of the task, such that a component requesting access to the memory ring bus 204 may be provided with immediate access or may be required to wait.

It should be noted that different types of bus architectures may be used within the graphics system 200, without departing from the scope of the present invention. For example, each component of the graphics system 200 may be directly connected to the memory controller 206, as well as to the PCIe bus interface 210, in which case no shared bus of the memory ring bus type would be required within the graphics system 200.

Another component of the graphics system 200 is the copy engine 214, which is responsible for copying data between the system memory of the host computing system and the video memory 208. More specifically, the copy engine 214 is called upon to copy data from the system memory to the video memory 208, where this data may for example consist of data needed by the graphics system 200 for a graphics operation. The copy engine 214 is also called upon to copy data from the video memory 208 to the system memory.

In the case of the example of implementation shown in FIG. 2, the copying operations performed by the copy engine 214 take place when the PCIe bus 212 and/or the memory ring bus 204 are free and available for use by the copy engine 214. In a non-limiting example, when the copy engine 214 wants to, for example, transfer data through the memory ring bus 204 to the memory controller 206 for storage in the video memory 208, the copy engine 214 may be provided with immediate access to the memory ring bus 204 upon requesting it or may have to wait for this access, just like any other component of the graphics system 200. Alternatively, the copy engine 214 may monitor the activity on the memory ring bus 204 and may transfer data to the memory controller 206 as soon as the memory ring bus 204 is available.

In the example of implementation shown in FIG. 2, access to the PCIe bus interface 210 by components of the graphics system 200 (including the copy engine 214) is only possible via the memory ring bus 204. In a variant example of implementation of the present invention, the copy engine 214 alone is provided with a direct connection to the PCIe bus interface 210 (not shown in FIG. 2), in addition to and separate from the memory ring bus 204. In this case, even when the memory ring bus 204 is not available to the copy engine 214 since it is busy supporting other functionality of the graphics system 200, the copy engine 214 can still access the PCIe bus 212 for writing data to or reading data from the system memory of the host computing system.

It should be noted that if the internal bus architecture of the graphics system 200 is such that all of the components are directly connected to the memory controller 206 and to the PCIe bus interface 210, the activity of the copy engine 214 would not be dependent on the availability of any memory ring bus. It is possible however that, in such a scenario, the copy engine 214 may monitor the activity of the memory controller 206 and perform writes to the video memory 208 on a basis of the availability of the memory controller 206.

In the example shown in FIG. 2, the graphics processor or pipeline 202 includes a Direct Memory Access (DMA) engine 218, a rasterizer 220, a texture engine 222, a pixel shader 224 and a render target engine 226. In a generalized example of the standard functionality of such a graphics processor 202, command lists are input to the graphics processor 202 through the PCIe interface 210 and may include instructions to draw or render a 2D or 3D primitive and store it in video memory 208. More specifically, the data of a command list may be fetched by the DMA engine 218 from system memory via the PCIe bus interface 210 or from video memory 208 via the memory controller 206. The DMA engine 218 is operative to configure the other modules of the graphics pipeline 102 with the appropriate states and to send a primitive's vertices to the next processing stage. Furthermore, the DMA engine 218 forwards instructions to the other modules of the graphics pipeline 202. The rasterizer 220 processes the primitive according to data and instructions provided by the DMA engine 218 and determines all pixels of screen space belonging to the processed primitive. The texture engine 222 fetches data in a texture and filters it. The pixel shader 224 computes the colors of the pixel according to the attributes of the primitive (e.g. texture and color), as well as the graphics processing states and instructions sent by the DMA engine 218. Finally, the render target engine 226 computes the depth and performs color blending. The standard operations by these graphical modules of a graphics processor 202 are well known and, as such, will not be discussed in further detail herein.

As has been well documented, various different graphics techniques exist and may be implemented by respective graphical modules within the graphics processor 202, for enhancing in different ways the perceived quality of the images output to the display 232. Thus, although four such dedicated graphical modules are shown in FIG. 2, the graphics system 202 may include more or less than four without departing from the scope of the present invention. For example, the graphics processor 202 may also include a vertex shader for receiving a primitive from the DMA engine 218 and converting the primitive's coordinates from model space to homogenous space. In another example, the graphics processor 202 may also include a clipping engine for determining the portion of the primitive lying within a predefined region and forwarding the result of this processing to the rasterizer 220.

It should be noted that some of the dedicated graphical modules of the graphics processor 202, notably the pixel shader 224, the texture engine 222 and the render target engine 226, are directly connected to either the memory controller 206 or the memory ring bus 204, in order to be able to access data in video memory 208 or system memory during the processing of a primitive.

Specific to the present invention, the copy engine 214 is enabled to recognize encrypted data and to perform decryption/encryption operations, thus becoming responsible for enforcing a cryptographic protection scheme for secure content transferred between the host computing system and the graphics system 200. The copy engine 214 thus implements the standard copying functionality, as well as a cryptographic protection functionality, independently of the primary resources (such as the graphics processor 202 and the memory controller 206) of the graphics system 200, leaving these primary resources free to perform their own standard operations in parallel to the operations performed by the copy engine 214. Note that, although independent, the copy engine 214 may still receive and execute a copy instruction forwarded from the graphics processor 202, as well as have to wait for access to the video memory 208 due to unavailability of the memory controller 206.

Figure 3:
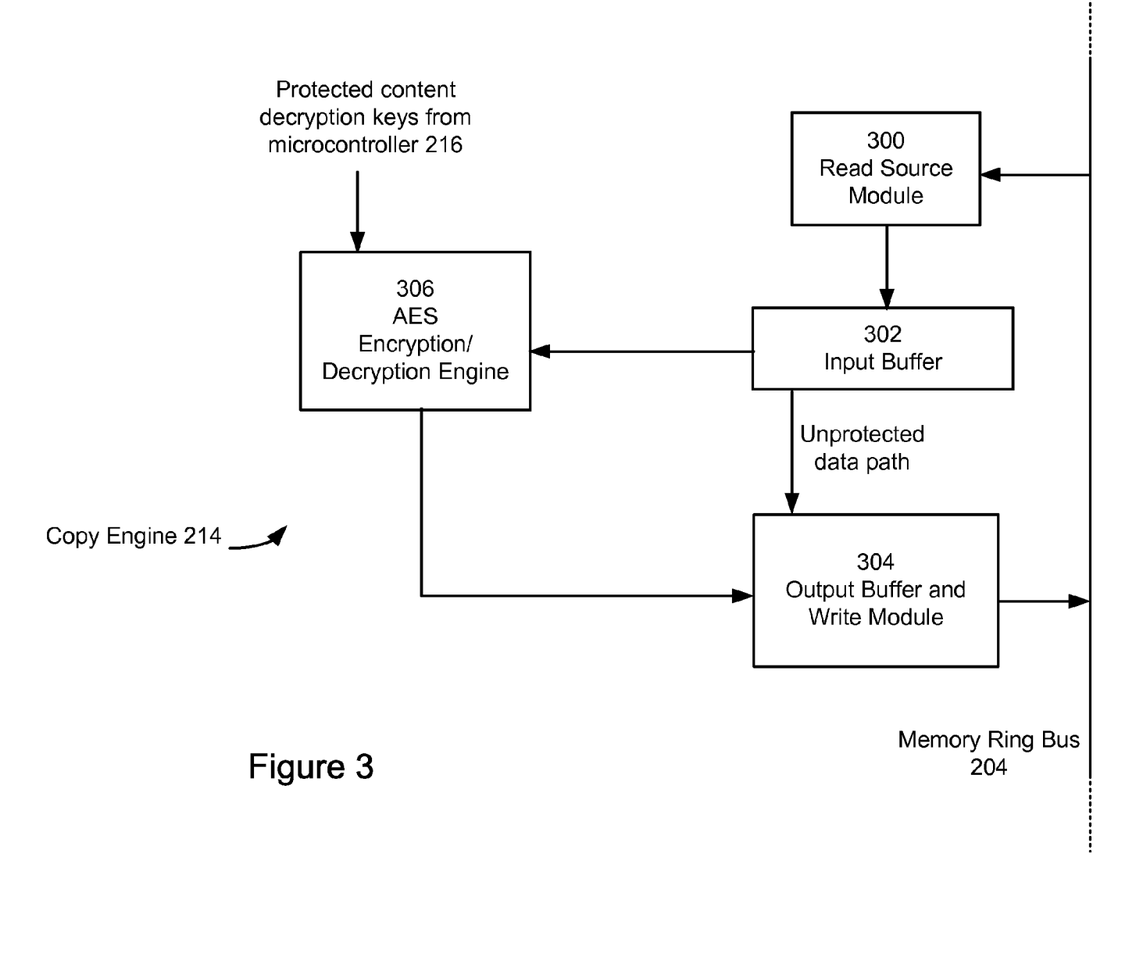
FIG. 3 is a schematic block diagram depicting the copy engine shown in FIG. 2, in accordance with a non-limiting example of implementation of the present invention.

FIG. 3 is a schematic block diagram of copy engine 214, in accordance with a non-limiting example of implementation of the present invention. In addition to the standard read source module 300, input buffer 302 and output buffer/write module 304, the copy engine 214 includes a decryption module 306, which reads data from the input buffer 302 and transfers data to the output buffer/write module 304. Thus, the decryption module 306 provides a protected data path between the input buffer 302 and the output buffer/write module 304. The decryption module 306 of the copy engine 214 is operative to decrypt encrypted data with one or more decryption keys.

Note that copy instructions to be executed by the copy engine 214 may be sent directly to the copy engine 214 from the host computing system via a driver of the graphics system 200. Alternatively, a copy instruction may initially be sent to the graphics processor 202, which would then forward the copy instruction to the copy engine 214 for execution.

In the non-limiting example of implementation shown in FIGS. 2 and 3, two types of keys are used by the decryption module 306 to perform the decryption operations, notably a session key and a transmission key. The session key, calculated using a lengthy and complex algorithm, is used to decrypt the transmission key, which in turn is used to decrypt the data stream. The transmission key is stored encrypted in system memory. The session key is provided to the decryption module 306 of the copy engine 214 by the microcontroller 216, which therefore acts as a key generator.

In operation, the copy engine 214 receives a copy instruction including a key processing request, in response to which the copy engine 214 reads the transmission key from system memory and decrypts it using the session key. Once decrypted, the transmission key is kept internal and hidden inside the copy engine 214 for data stream decryption/encryption.

It should be noted that, although in FIG. 2 the microcontroller 216 provides the session key to the copy engine 214 via a separate, dedicated path, the microcontroller 216 could alternatively use the memory ring bus 204 to transfer the key to the copy engine 214. It should also be noted that more than one distinct transmission keys may be used independently to decrypt and encrypt data streams.

In a variant example of implementation, the graphics system 200 could include a separate, dedicated key generator module, coupled to the copy engine 214 for computing the session key and providing it to the copy engine 214 as needed. In yet another alternative, the copy engine 214 could itself include a key generator module, such that key generation, handling and management would all be handled within the copy engine 214.

In another variant example of implementation, the copy instruction commanding the protected transfer that is received by the copy engine 214 may include a transmission key. In this case, the copy engine 214 extracts the transmission key from the copy instruction, decrypts the transmission key with the session key and uses this transmission key to decrypt/encrypt the corresponding data stream.

In a specific, non-limiting example, the cryptography algorithm used to transmit data over the PCIe bus 212 from the host computing system to the graphics system 200 (and therefore also used by the decryption module 306 of the copy engine 214) is the Advanced Encryption Standard (AES), also known as Rijndael. AES is a block cipher adopted as an encryption standard by the U.S. government and is one of the most popular algorithms used in symmetric key cryptography, since it is fast in both software and hardware, is relatively easy to implement and requires little memory. Alternatively, a different cryptography algorithm could be used, without departing from the scope of the present invention. Examples of other such cryptography algorithms include the Data Encryption Standard (DES) and the RSA public-key algorithm, among many other possibilities. Since the details of the particular cryptography algorithm used by the copy engine 214 are not critical to the success of the present invention, they will not be discussed in further detail herein.

In the example shown in FIG. 3, the decryption module 306 is an AES encryption/decryption engine. Since the AES algorithm is symmetric, the same steps are used to decrypt data as are used to encrypt data. Accordingly, not only is the copy engine 214 used to decrypt data being copied from the system memory to the video memory 208, but it may also be used to encrypt data being sent out from the graphics system 200 over the PCIe bus 212. In the case of encryption operations performed by the copy engine 214, the transmission keys are stored in video memory 208 and can be read or written by the encryption engine 306.

Note that any type of data may be transferred between the system memory of the host computing system and the video memory 208 of the graphics system, including graphics data, video data and audio data. Accordingly, the copy engine 214 is capable to perform its decryption/encryption operations on any type of data.

In a variant example of implementation, rather than receiving copy instructions, the copy engine 214 reads its copy instructions from system memory or video memory 208 whenever the copy engine 214 is free to process these instructions. The copy engine 214 thus obtains information such as the location of the data to be copied, the destination of the data to be copied, the range of memory to be copied, the type of data to be copied, the type of copy, which of the transmission keys to use for protected transfers, among many other possibilities.

Figure 5:
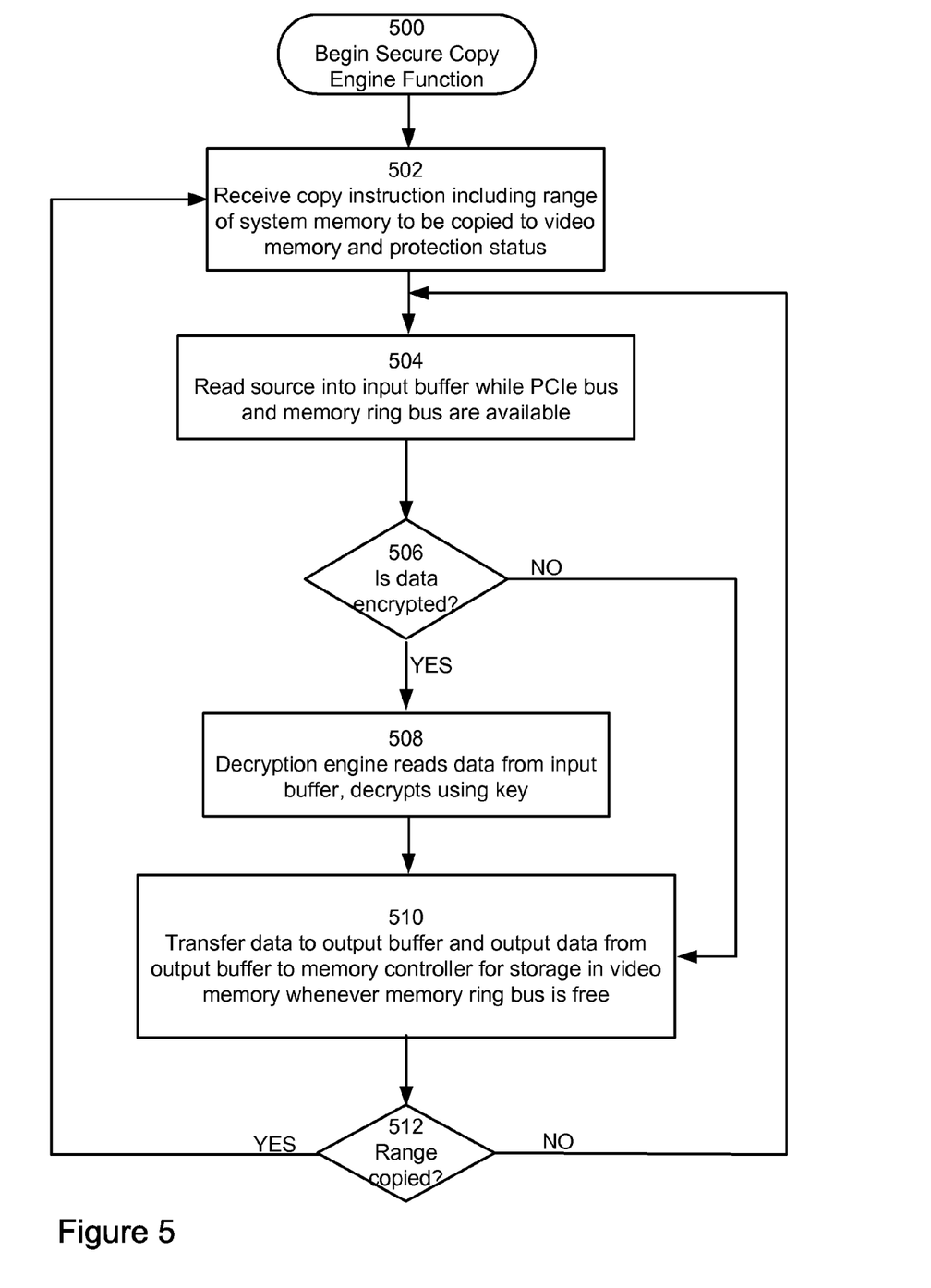
FIG. 5 is a flow diagram illustrating the memory copy process implemented by the copy engine of FIG. 3, in accordance with a specific non-limiting example of implementation of the present invention.

FIG. 5 is a flowchart illustrating the memory copy process implemented by copy engine 214, according to a non-limiting example of implementation of the present invention. Note that, in this example, the copy engine 214 is copying data from the system memory to the video memory 208; however, a similar process is implemented by the copy engine 214 when copying data from video memory 208 to system memory, in which case the copy engine 214 must encrypt unencrypted data, rather than decrypting encrypted data. At step 502, the copy engine 214 receives a copy instruction including a range of system memory to be copied to video memory 208. This instruction may have been generated by the microcontroller 216 of the graphics system 200 or, alternatively, by the CPU of the host computing system. Next, the copy engine 214 reads data from the specified range into input buffer 302, whenever the PCIe bus 212 and the memory ring bus 204 are free and available for use by the copy engine 214, at step 504. If the data read from the specified range is encrypted, the decryption module 306 next reads the data from the input buffer 302 and decrypts the read data using one of the transmission decryption key(s) stored internally in the copy engine 214, at step 508. At step 510, the copy engine 214 transfers the decrypted data to the output buffer/write module 304 and outputs the decrypted data from the output buffer 304 to the memory controller 206 for storage in the video memory 208 whenever the memory ring bus 204 is free. At step 512, the copy engine 214 checks whether the entire range of system memory specified by the copy instruction has been copied. If so, the copy engine 214 awaits receipt of another instruction. If not, the copy engine 214 continues reading data from the specified range of system memory at step 504. If at step 506 the data read from the specified range is not encrypted, the copy memory process bypasses the decryption step 508 and skips to step 510, transferring the read data directly from the input buffer 302 to the output buffer/write module 304.

It should be noted that a synchronization process may have to be implemented by the graphics system 200 in order to ensure fidelity of the data stored in video memory 208 and accessed separately by different components of the graphics system 200. For example, take the case where the copy engine 214 copies data from system memory to video memory 208. If the graphics processor 202 needs to access the copied data in video memory 208, a synchronization step may be required in order to ensure that the copy engine 214 has completed the data transfer before the data is retrieved from video memory 208 by the graphics processor 202. A user or an application running on the host computer may request the synchronization of the two processors (copy engine 214 and graphics processor 202) via the driver of the graphics system 202.

In addition to implementing a synchronization process, the graphics system 200 may implement various measures for controlling access to the video memory 208. Since different entities may attempt to access video memory 208 in different ways, the following are examples of different possible access control measures implemented by the graphics system 200:

Video memory 208 may be accessed by one of the processors of the graphics system 200 (such as the graphics pipeline 202, the copy engine 214, the video processing engine 234 or the microcontroller 216. Each one of these processors is programmed by the host computing system (an application running on the host computing system) via the driver of the graphics system 200. Since the driver is normally the only one accessing these processors, the graphics system 200 may rely on detection by the driver of any attempt by another entity to use one of these processors, where such an attempt would be revealed to the driver by internal state changes.

Video memory 208 may be directly accessed by a processing unit through the PCIe bus 212 and the memory controller 206, without going through any of the processors of the graphics system 200. These accesses are referred to as direct video memory accesses. In the case of such a direct video memory access, the PCIe bus interface 210 of the graphics system 200 informs the graphics system 200 driver that a suspicious access has been performed in a given protected memory range. If such an access is detected, the driver will automatically assume that a malicious party is tampering with the graphics system 200.

Video memory 208 may be accessed by the display engine 230 to output data from the graphics system 200. In this case as well, the driver configures the display engine 230, such that the graphics system 200 may rely on the driver to verify that the configuration of the display engine 230 has not been changed by a malicious party.

In a specific, non-limiting example, the copy instruction received by the copy engine 214 includes a protection status, which is indicative of whether the data to be copied is encrypted or not. This protection status is generated by either the microcontroller 216 or the CPU of the host computing system, upon determining that a range of system memory is to be copied between the video memory 208 of the graphics system 200 and the system memory. This protection status triggers the copy engine 214 to perform the decryption operation in the case of encrypted data or the encryption operation in the case of unencrypted data. In a variant example, the protection status is embedded in the data to be copied (e.g. in the header) and the copy engine 214 extracts the protection status from the data in order to determine if the data read from the specified range is encrypted or not, prior to reading the data from the input buffer 302. In yet another variant example, the protection status associated with data to be copied is inferred by the copy engine 214 on a basis of the particular range of system memory from which the data is read. Thus, the copy engine 214 determines if the data to be copied is encrypted or not by determining if the particular range of system memory belongs to a region of memory dedicated to storing encrypted data or a region of memory dedicated to storing unencrypted data.

Note that if the internal bus architecture of the graphics system 200 is such that all of the components are directly connected to the memory controller 206 and to the PCIe bus interface 210, the activity of the copy engine 214 would not be dependent on the availability of the memory ring bus 204. Rather, the copy engine 214 may monitor the activity of the memory controller 206 and perform writes to the video memory 208 at step 510 on a basis of the availability of the memory controller 206.

Since the copy engine 214 is acting on secure content and, in the context of the present invention, is responsible for providing a protected data path for this secure content from the time it is received by the graphics system 200 to the time it is stored in video memory 208, one or more protection mechanisms may be put in place within the graphics system 200 to ensure that decrypted data output by the copy engine 214 can only go to local memory, that is to video memory 208. The copy engine 214 itself can be designed to implement the one or more protection mechanisms, that is to ensure that data transfers out of the copy engine 214 ensure the continued protection of the decrypted data. Alternatively, these protection mechanisms can be implemented by one of or both the memory controller 206 and the microcontroller 216. One possible example of such a protection mechanism involves the use of a key validity status, whereby protected data transfers are blocked when this status information is set to invalid. Moreover, corresponding error status flags may be raised when such prohibited behaviors are encountered.

In a specific, non-limiting example, another possible protection mechanism involves the use of protected memory portions within the video memory 208, where these protected memory portions are dedicated to storing data output by the copy engine 214. Thus, decrypted data output by the copy engine 214 can only be written into a protected memory portion of the video memory 208, from which it can be securely operated upon by the graphics processor 202 and/or the other graphical modules of the graphics system 200.

In a variant example of implementation of the present invention, the decryption module 306 of the copy engine 214 is further capable to perform the cryptographic task of authentication. More specifically, the decryption module 306 is able to authenticate the copy engine 214, and thus the graphics system 200, as being secure to an external computing system or application. Various different techniques for such cryptographic authentication exist and are well known to those skilled in the art, such that they will not be described in further detail herein.

In another variant example of implementation of the present invention, the copy engine 214 is dedicated to decrypting encrypted content being copied from the system memory to the video memory 208. In this case, the decryption module 306 of the copy engine 214 automatically decrypts any data read into the input buffer 302 and transfers the decrypted data to the output buffer 304. Obviously, in this scenario, there is no need for the protection status described above, since decryption is automatically performed on all data processed by the copy engine 214. In a similar variant example of implementation, the copy engine 214 may be dedicated to encrypting unencrypted content being copied between from the video memory 208 to the system memory. In this case, the decryption module, which is in fact an encryption/decryption engine, automatically encrypts any data read into the input buffer 302 and transfers the encrypted data to the output buffer 304. It should be noted that the graphics system 200 may include two or more copy engines 214, each of which may be dedicated to one of decryption and encryption functionality. In a specific, non-limiting example, the graphics system 200 includes three copy engines, the first of which performs the standard copying functionality (with or without the encryption/decryption functionality), the second of which is dedicated to decryption operations and the third of which is dedicated to encryption operations.

It should be noted that the components and modules of the graphics system 200, as well as of the host computing system described herein may all be implemented in software, hardware, firmware or any combination thereof. In one specific, non-limiting example, the graphics system 200 is a video (or graphics) card with a bus connector that inserts into a port on a typical computer. The video card also includes a monitor connector that receives a cable that connects to a monitor. The video card can include a digital video connector (e.g. a Digital Visual Interface (DVI)) that can be used for sending video images to LCD and flat panel monitors and the like.

Although various embodiments have been illustrated, this was for the purpose of describing, but not limiting, the present invention. Various possible modifications and different configurations will become apparent to those skilled in the art and are within the scope of the present invention, which is defined more particularly by the attached claims.

What is claimed is:

1. A graphics system connectable via an external bus to a computing system, the computing system including a system memory, said graphics system comprising:
   a) a video memory for storing data;
   b) a memory controller coupled to said video memory, said memory controller operative to control the flow of data to and from said video memory by receiving and handling requests to read from and write to the video memory;
   c) a graphics processor operative to process data received by said graphics system, data stored in said video memory and data stored in the system memory; and
   d) a copy engine including an encryption/decryption engine, the copy engine responsive to a copy instruction including a range of addresses included in the system memory to copy data from the range of addresses included in the system memory to said video memory, said copy engine performing said copy instruction by requesting the data from the system memory and transferring the data to said memory controller for writing to said video memory, said copy engine acting independently of both said graphics processor and said memory controller, said copy engine and being operative to:
      i) decrypt encrypted data read from the system memory over the external bus; and
      ii) transfer the decrypted data to said video memory via said memory controller, wherein said copy engine is responsive to a copy instruction including a range of addresses included in the video memory to copy data from the range of addresses included in the video memory to the system memory, said copy engine being operative to:
         a) encrypt unencrypted data requested from the video memory via said memory controller; and b) transfer the encrypted data to the system memory over the external bus.

2. A graphics system as defined in claim 1, wherein said encryption/decryption engine of said copy engine decrypts encrypted data on a basis of at least one decryption key.

3. A graphics system as defined in claim 2, wherein said encryption/decryption engine implements the Advanced Encryption Standard (AES) cryptography algorithm.

4. A graphics system as defined in claim 1, wherein said graphics system further includes an internal bus interconnecting the various components of said graphics system, said copy engine acting on the basis of an availability of said internal bus when writing data to or reading data from said video memory.

5. A graphics system as defined in claim 1, wherein said copy engine includes a read source module, an input buffer and a write module with output buffer.

6. A graphics system as defined in claim 1, wherein said copy instruction including the range of addresses included in the system memory includes a protection status indicative of whether the data to be copied is encrypted or not.

7. A graphics system as defined in claim 6, wherein said copy engine uses said protection status to recognize said encrypted data and to initiate decryption of said encrypted data.

8. A graphics system as defined in claim 1, wherein said copy engine is operative to read said copy instruction from one of the system memory and said video memory whenever said copy engine is free to process said copy instruction.

9. A copy engine for a graphics system connected via an external bus to a computing system, the graphics system including a graphics processor, a video memory and a memory controller operative to control the flow of data to and from the video memory by receiving and handling requests to read from and write to the video memory, the computing system including a system memory, said copy engine including an encryption/decryption engine, the copy engine being responsive to receipt of a copy instruction including a range of addresses included in the system memory to copy data from the range of addresses included in the system memory to the video memory, said copy engine performing said copy instruction by requesting the data from the system memory and transferring the data to the memory controller for writing to the video memory, said copy engine acting independently of both the graphics processor and the memory controller, said copy engine being operative to:
  a) decrypt encrypted data requested from the system memory over the external bus; and
  b) transfer the decrypted data to the memory controller for writing to the video memory,
  wherein said copy engine is responsive to a copy instruction including a range of addresses included in the video memory to copy data from the range of addresses included in the video memory to the system memory, said copy engine being operative to:
    a) encrypt unencrypted data requested from the video memory via said memory controller; and
    b) transfer the encrypted data to the system memory over the external bus.

10. A copy engine as defined in claim 9, wherein said encryption/decryption engine of said copy engine decrypts encrypted data on a basis of at least one decryption key.

11. A copy engine as defined in claim 10, wherein said encryption/decryption engine implements the Advanced Encryption Standard (AES) cryptography algorithm.

12. A copy engine as defined in claim 9, wherein the graphics system further includes an internal bus interconnecting the various components of the graphics system, said copy engine acting on the basis of an availability of the internal bus when writing data to or reading data from the video memory.

13. A copy engine as defined in claim 9, wherein said copy engine includes a read source module, an input buffer and a write module with output buffer.

14. A method for securely copying data from a system memory of a computing system to a video memory of a graphics system, the graphics system being connected via an external bus to the computing system, the graphics system including a graphics processor, a memory controller for controlling the flow of data to and from the video memory by receiving and handling requests to read from and write to the video memory and a copy engine including an encryption/decryption engine, the copy engine for copying data from the system memory to the video memory and from the video memory to the system memory, said method comprising:
  a) receiving at the copy engine a copy instruction including a range of addresses included in the system memory to be copied, the copy instruction including a protection status indicative of whether data included in the range of addresses included in the system memory to be copied is encrypted or not;
  b) requesting, by the copy engine, the data from the range of addresses included in the system memory;
  c) if the data requested from the range of addresses included in the system memory is encrypted, decrypting in the copy engine the data requested from the range of addresses included in the system memory, said requesting and decrypting steps being performed independently of both the graphics processor and the memory controller of the graphics system;
  d) transferring the decrypted data from the copy engine to the memory controller for writing to the video memory;
  e) receiving at the copy engine a copy instruction including a range of addresses included in the video memory to be copied to the system memory;
  f) requesting, by the copy engine, data from the range of addresses included in the video memory;
  g) if the data requested from the range of addresses included in the video memory is to be encrypted, encrypting in the copy engine the data requested from the range of addresses included in the video memory; and
  h) transferring the encrypted data to the system memory over the external bus.

15. A method for securely copying data from a video memory of a graphics system to a system memory of a computing system, the graphics system being connected via an external bus to the computing system, the graphics system including a graphics processor, a memory controller for controlling the flow of data to and from the video memory by receiving and handling requests to read from and write to the video memory and a copy engine including an encryption/decryption engine, the copy engine for copying data from the video memory to the system memory, said method comprising:
  a) receiving at the copy engine a copy instruction including a range of addresses included in the video memory to be copied, the copy instruction including a protection status indicative of whether data included in the range of addresses included in the video memory to be copied is to be encrypted or not;
  b) requesting, by the copy engine, the data from the range of addresses included in the video memory via the memory controller;

c) if the data requested from the range of addresses included in the video memory is to be encrypted, encrypting in the copy engine the data requested from the range of addresses included in the video memory;
d) transferring the encrypted data from the copy engine to the system memory via the external bus, said encrypting and transferring steps being performed independently of both the graphics processor and the memory controller of the graphics system;
e) receiving at the copy engine a copy instruction including a range of addresses included in the system memory to be copied to the video memory;
f) requesting, by the copy engine, data from the range of addresses included in the system memory;
g) if the data requested from the range of addresses included in the system memory is encrypted, decrypting in the copy engine the data requested from the range of addresses included in the system memory, said requesting of the data from the range of addresses included in the system memory and the step of decrypting each performed independently of both the graphics processor and the memory controller of the graphics system; and
h) transferring the decrypted data from the copy engine to the memory controller for writing to the video memory.

* * * * *